United States Patent
Bongaerts et al.

[11] Patent Number: 5,808,413
[45] Date of Patent: Sep. 15, 1998

[54] PLASMA ADDRESSED LIQUID CRYSTAL DISPLAY WITH ORGANIC-WALLED PLASMA CHANNELS

[75] Inventors: Petrus Franciscus Gerardus Bongaerts, Waalre; Henri R. J. R. Van Helleputte, Eindhoven; Adrianus Leonardus Josephus Burgmans, Eindhoven; Jacob Bruinink, Eindhoven, all of Netherlands; Babar Ali Khan, Ossining, N.Y.; Karel Elbert Kuijk, MR Dommelen, Netherlands

[73] Assignee: Philips Electronics North America Corporation, New York, N.Y.

[21] Appl. No.: 966,551

[22] Filed: Nov. 10, 1997

Related U.S. Application Data

[63] Continuation of Ser. No. 573,855, Dec. 18, 1995, abandoned.

[51] Int. Cl.⁶ .................................. H01J 5/48; H01J 5/08
[52] U.S. Cl. .............................. 313/585; 313/582
[58] Field of Search ...................... 313/495, 496, 313/497, 493, 584, 582, 586, 585, 587; 315/169.1, 169.4

[56] References Cited

U.S. PATENT DOCUMENTS

| | | | |
|---|---|---|---|
| 3,866,084 | 2/1975 | Kurahashi et al. | 315/169.1 |
| 5,214,521 | 5/1993 | Kwon et al. | 359/54 |
| 5,268,782 | 12/1993 | Wenz et al. | 359/81 |
| 5,336,121 | 8/1994 | Baret | 313/586 |
| 5,349,454 | 9/1994 | Iwama | 359/54 |
| 5,461,395 | 10/1995 | Stein | 313/586 |
| 5,589,731 | 12/1996 | Fahlen et al. | 313/495 |
| 5,614,781 | 3/1997 | Spindt et al. | 313/495 |

OTHER PUBLICATIONS

Buzak et al, "A 16–Inch Full Color Plasma Addressed Liquid Crystal Display", Digest of Tec. Papers, 1993 SID Int, Symp., Soc. for Info. Displ. pp. 883–886.

*Primary Examiner*—Sandra L. O'Shea
*Assistant Examiner*—Michael Day
*Attorney, Agent, or Firm*—John C. Fox

[57] ABSTRACT

A flat display device preferably of the PALC type in which the plasma channels are defined by walls of an organic material, preferably a polyimide material. A protective layer is provided over the polyimide walls to prevent deterioration. Spaced electrode portions are preferably provided on facing surfaces of the walls. The preferred method is to lay down a thick layer of polyimide material and a thin resist over the polyimide layer, pattern the resist, and then use the resist to pattern the polyimide layer in the shape of the desired walls. The walls are then covered with a thin dielectric sheet-like member to form the plasma channels.

6 Claims, 3 Drawing Sheets

PLASMA ADDRESSED LIQUID CRYSTAL DISPLAY WITH ORGANIC-WALLED PLASMA CHANNELS

This is a continuation of application Ser. No. 08/573,855, filed Dec. 18, 1995, now abandoned.

RELATED APPLICATIONS

1) Application, Ser. No. 08/361,078, filed Dec. 21, 1994, now U.S. Pat. No. 5,696,569, (5604-0375).

2) Application, Ser. No. 08/407,536, filed Mar. 20, 1995, now U.S. Pat. No. 5,626,772, (5604-0379).

3) Application, Ser. No. 08/413,052, filed Mar. 29, 1995, now U.S. Pat. No. 5,596,431, (5604-0382).

4) Application, Ser. No. 08/535,697, filed Sep. 28, 1995, (5604-0385).

BACKGROUND OF INVENTION

This invention relates to plasma-addressed liquid crystal display panels commonly referred to as "PALC" display devices. These devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. patents and publication, the contents of which are hereby incorporated by reference: Buzak et al., "A 16-Inch Full Color Plasma Addressed Liquid Crystal Display", Digest of Tech. Papers, 1993 SID Int. Symp., Soc. for Info. Displ. pp. 883–886.

As will be appreciated from the foregoing description, the panel is an electronic array of data elements in the form of pixels and the plasma channel behaves as an addressing structure for the array in which selectively accessing an electrode in a channel in turn selectively ionizes a gas to address one or more of the data elements.

A cross-section of the PALC display described in the 1993 SID Digest is shown in FIG. 2. The method described in the referenced publication for making the plasma channels is to chemically etch a flat glass substrate to form parallel recesses defined by spaced ridges or mesas and to bond on top of the mesas a thin dielectric cover sheet having a thickness in the range of about 30–50 $\mu$m. In general, forming the plasma channels by wet etching, typically to a depth of about 100–150 $\mu$m, causes certain problems in obtaining uniformly sized channels and is time consuming, as well. The uniformity problem is due to such factors as inhomogeneity of etch velocity, roughness of the channel walls, and local defects in the mesas, the structure that separates the multiple channels.

In order to make the cover sheet of the plasma channel part more rigid, U.S. Pat. No. 5,214,521 proposed a construction in which the electrodes are deposited on a flat bottom plate while the top plate is etched back to form channels shaped as hemi-cylinders—the inverse of that shown in FIG. 2—in such a way that the remaining glass at the top of the channels is thin enough to allow addressing of the adjacent LC material. However, due to the circular curvature of the top plate, between the plasma discharge and the LC material, the glass thickness and thus the voltage drop over the LC material varies significantly for each pixel. In practical situations, this reduces the number of gray levels of the display.

U.S. Pat. No. 5,349,454 describes a construction wherein the electrodes are formed on a flat substrate, and on top of the electrodes are formed insulating ribs that constitute the lateral mesas or separating walls of each plasma channel, a flat thin dielectric sheet then being adhered to the tops of the ribs. This patent does not describe how the ribs are formed, but a commonly-assigned laid-open EPO application, No. 0 500 085 A2 describes the forming process as screen printing.

SUMMARY OF INVENTION

An object of the invention is an improved channel plate for an electronic array, in particular, a flat display device.

A further object of the invention is an improved plasma-addressed display device.

Another object of the invention is an improved method for fabricating the plasma channels of a PALC display device.

In accordance with a first aspect of the invention, a channel plate for an electronic array, in particular, a flat display device, comprises a substantially transparent substrate and a thin dielectric sheet-like member arranged over and spaced from the substrate by a plurality of mesas flanking and defining channels. Each of the mesas are formed by a patterned layer of an organic material. Preferably, the organic material is a polyimide material. Spaced electrode layers are provided in each channel. Preferably, the electrodes are provided on facing surfaces of each pair of mesas defining a channel.

In accordance with a first preferred embodiment of the invention, the display device is a PALC display device, and the combination of the substrate, spaced polyimide walls or mesas, and the overlying thin dielectric sheet-like member constitutes the plasma channels or channel plate of the PALC display device.

In accordance with a second aspect of the invention, the polyimide mesas are covered by one or more thin protective layers. Preferably, the protective layers are substantially transparent and electrically insulating, and are formed by a vapor-depositing technique. Polyimides are commonly employed as protective layers in the manufacture of certain semi-conductor devices. Such devices are typically not operated in an evacuated enclosure, much less in a gas adapted to create a plasma when activated. Hence, in the application of polyimides in semiconductors, protective layers are usually not needed for the polyimide material. In contrast, for application in the fabrication of channel plates for PALC display device, the polyimide mesas are present in a gas filled enclosure whose gas composition and purity control the operating performance of the plasma. Deterioration of vapors from the polyimide materials can have a deleterious effect on the operation of the channel plate. The presence of the protective layer or layers over the polyimide mesas protects them from ion bombardment when the plasma is generated and thus prevents deterioration into the plasma chamber.

In accordance with a first preferred embodiment of the method of the invention, a substrate is covered with a thick layer of polyimide, which is then covered with a thin layer of a photosensitive resist. Following exposure of the photoresist, the coated substrate is treated to develop the resist, following which the unexposed resist portions are removed leaving in place a patterned resist. The underlying polyimide portions are then selectively removed to form a patterned polyimide layer, followed by removal of the remaining resist material. The protective layer is then applied to the patterned polyimide layer, followed by provision of the electrodes and the cover plate.

The main advantages are that the walls of the channels are less rough, and the procedure takes considerably less time than the known way of making the channel plate using wet chemical etching.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

It will be noted that the figures are not to scale, nor are FIGS. 3–6 drawn to the same scale as FIGS. 7–10.

DETAILED DESCRIPTION OF PREFERRED EMBODIMENTS

Figure 1:
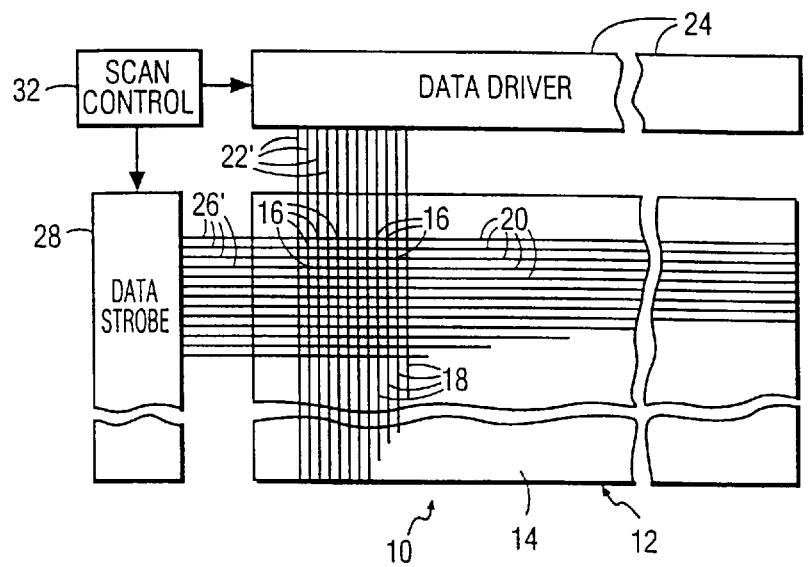
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34 (FIG. 2), and the channel rows are usually built into a second transparent substrate 36. Skilled persons will appreciate that certain systems, such as a reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion as had been described. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
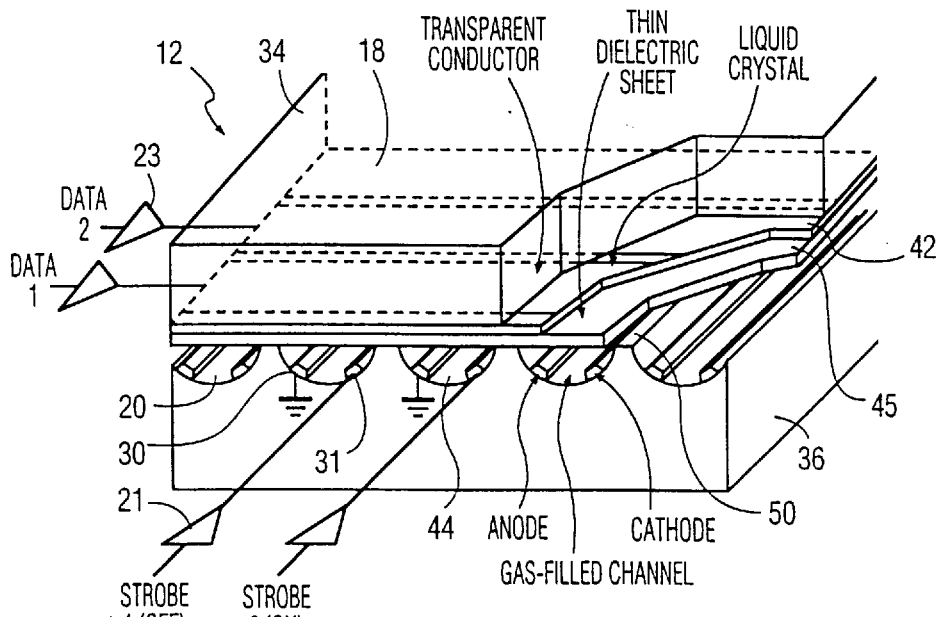
FIG. 2 is a perspective view of part of a conventional PALC display device.

FIG. 2 illustrates the PALC version of such a flat display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

Fabrication of a PALC device is typically done as described in the 1993 SID digest paper by providing first and second substrates 34, 36 with the first substrate 34 comprising a glass panel on which is vapor-deposited the ITO column electrodes 18, followed by color filter processing over the ITO electrodes to produce the RGB stripes (not shown), followed by the black surround processing and liquid crystal alignment processing. The second substrate 36, also a glass panel, is masked and etched to form the channels 20, following which the plasma electrode material is deposited and masked and etched to form the cathode 31 and anode 30 electrodes. A thin dielectric glass microsheet 45 is then sealed across the channel ridges 50 to seal off the channels 20, which are then exhausted, back-filled with a low-pressure ionizable gas such as helium and/or neon and optionally with a small percentage of argon, or other gasses, and sealed off. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

In accordance with the present invention, the channel plate is constructed with substantially vertical mesas forming the flanking side walls of each channel, and the mesas are constituted by organic materials, and in particular by polymer dielectrics such as the polyimide materials that are widely used in the semiconductor art in intermetal dielectric applications. Polyimide materials are preferred, as they have a high dielectric constant, they form solutions easily applied by standard spin-coating, and are available commercially in various solution forms from many suppliers. However, any organic material in general can be employed provided that (a) it can be applied to form a dielectric coating or layer of the required thickness, (b) it can be hardened, as by baking, and (c) it can be patterned, usually by dissolving or softening in a suitable solvent or etching by dissolution. If the material is photosensitive, it can be directly exposed and developed in the conventional manner for patterning. If not photosensitive, a separate resist can be used for patterning. It is even possible to pattern by physical pressing, as is used to make CDs.

The channel plate structure in a preferred method is made as follows. The starting point (FIG. 3) is a thick flat bottom plate 36, for example, of glass, which forms a substantially transparent substrate for plasma channels. Over the bottom plate 36 is deposited in a conventional manner a layer 38 of a polyimide material to a desired thickness. A suitable thickness for the PALC application is 100–150 $\mu$m. Depending on the viscosity of the polyimide solution, the layer can be formed by spin-coating or by spray-coating or any known coating technique in one or several layers to the desired thickness. Over the polyimide layer 38 is provided a layer of a photoresist 40. The resist may be constituted of any one of many commercially-available resists, such as 2P or diacryl like resists, to a suitable thickness of, for example, a few (1–3) $\mu$m.

The resist layer is then exposed to sensitizing radiation 41 through a suitable mask 42 and the assembly subjected to a standard developing process for the resist 40. Assuming a positive resist is employed, then the radiation, which may be any radiation to which the resist is sensitive, such as UV radiation, causes the exposed resist portions 44 to depolymerize and soften and the softened portions are readily removed (FIG. 4), leaving behind the unexposed resist portions 46. A second developer solution, appropriately chosen for the polyimide material, is then applied which attacks and softens or dissolves the polyimide regions below the removed resist portions 44, with the result, shown in FIG. 5, that the polyimide regions underlying the holes 44 in the resist are also removed, thus leaving behind a patterned resist layer 46 overlying a similarly patterned polyimide layer 48.

Any of many well-known suitable developer solutions for the resist can be used, and any of many well known suitable developer solutions for the polyimide material can be used, which are readily available from many commercial suppliers.

The remaining resist material 46 is then removed (FIG. 6) by subjecting it to any suitable solvent. After this removal step, the patterned polyimide layer 48 is hardened by subjecting the substrate to a baking step at a temperature of the order, for example, of 400° C., known in the art as a hardbake. This makes the polyimide material thermally less active.

FIGS. 3–6 illustrate a sequence of steps that can generally be used to produce any desired pattern of polyimide walls or mesas, whether regular or irregular. The pattern of mesas for a PALC display device is, in general, very regular, with all of the mesas having the same height and the same width and the same pitch (equally spaced apart).

Figure 7:
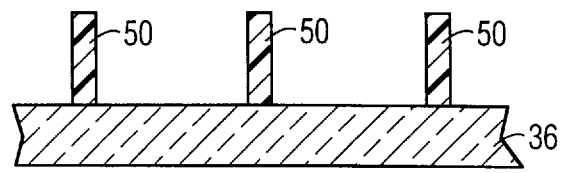
FIGS. 7–9 are schematic cross-sectional views showing further steps in the fabrication of one form of channel plate according to one form of the method of the invention.
Figure 8:
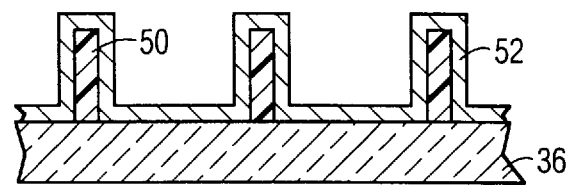

FIG. 7, to a different scale, shows again the intermediate product produced following the sequence of steps of FIGS. 3–6, but now applied in particular to the fabrication of a channel plate for PALC display device. The structure comprises as before the substrate 36 with the upstanding baked polyimide mesas or walls 50. A suitable wall height, depending on pixel size, is about 80–150 $\mu$m. The substrate is now covered by vapor-deposition with a thin layer of a protective material 52 (FIG. 8). Suitable materials are glass, silicon oxide, silicon nitride, and aluminum oxide, materials commonly used in the electronic field. A suitable thickness of the protective layer 52 is in the range of 20 nanometers to 10 microns. Chemical vapor deposition or sputtering or evaporation and in general any vapor deposition technique at temperatures compatible with the materials can be used. If the layer 52 is applied everywhere, which is preferred, as it eliminates a need for another photolithographic step, the protective layer must be substantially transparent, because in the usual way in which a PALC device is operated, a light source is placed opposite one side of the PALC display and the user observes an image from the opposite side, the image being formed by the attenuation of the incident light by the addressed LCD imaging elements. The protective material noted above in the thickness range indicated must be sufficiently transparent to white light. Other materials that also can be made transparent and can serve to protect the polyimide material from deterioration from the plasma can be substituted.

Figure 9:
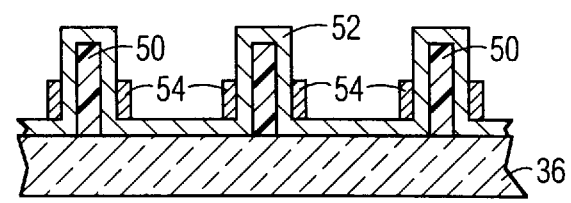

Following the provision of the protective layer 52, electrodes 54 can be applied in each channel in any known manner, preferably to the facing surfaces of the polyimide mesas 50 by any known technique. The metal layers of the electrodes, typically copper, about 2–10 μm thick, can be patterned using lithography. The second and third related applications referenced above describe a construction in which the side walls flanking each channel are generally vertical and straight, and the electrodes are formed on facing surfaces of the vertical side walls by various processes including plasma etching. The plasma etching process described in the third referenced patent application, whose contents are herein incorporated by reference, is the preferred technique, as it requires no additional photolithography steps (this is a self aligning process). Briefly, the method involves a blanket vapor deposition of a suitable electrode material, followed by an anisotropic plasma etching step, which preferentially etches off the electrode material everywhere except for the vertical sections at the bottom as shown in FIG. 9 at 54.

The last step in the process is to bond a thin flat dielectric sheet 56, for example, of glass, to the tops of the mesas over the protective layer 52, thus forming a plurality of channels 58. The active channels 58 are formed by adjacent elongated cavities each flanked by side walls 50, 52, a substantially flat substrate portion, also covered with the protective layer, and a substantially flat top wall portion 64 facing the bottom plate. The top sheet 56 may be sealed along the tops of the side walls in any known manner, for example, by means of fused glass frit or by anodic bonding to form the sealed plasma channels 58. In general, polyimides have limited resistance to very high temperatures, so, if fused frit is used, preferably the temperature is no higher than about 450° C. Alternatively, the periphery of the top sheet (not shown) may be sealed to the periphery of the bottom plate 36 (not shown) to seal off the structure, the individual channels not being required to be sealed off as a common gas is used for all the channels. The outer surface 66 of the top part 56 interfaces with the LC layer (not shown). The channels are later filled with an appropriate gas in which plasmas are generated as described above. The protective layer surfaces 52 shield the polyimide mesas from the plasma discharge and ion bombardment and prevent deterioration from the organic polyimide material that could contaminate the required gas atmosphere.

Figure 10:
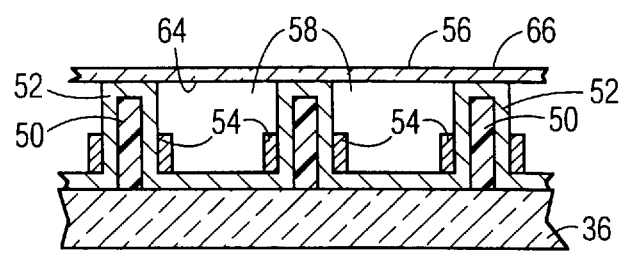
FIG. 10 is a schematic cross-sectional view of a part of a channel plate of one form of a channel plate according to the invention for use in a PALC color display.

As will be appreciated, what is shown in FIG. 10 is just a part from a larger assembly, since, typically, a PALC display device for monitor use would contain several hundred column electrodes 18 and several hundred plasma channels 58.

All of the methods described in the referenced related applications, patent and publication will be suitable for making the remaining parts of the panel of the invention.

Figure 3:
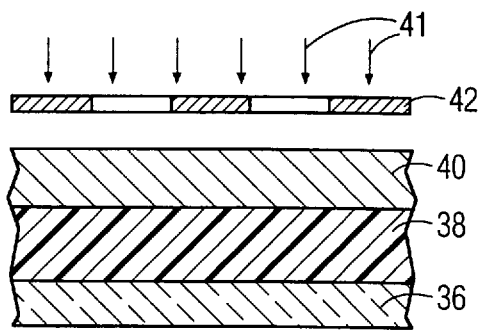
FIGS. 3–6 are schematic cross-sectional views showing various steps in the fabrication of a patterned polyimide layer for use in the manufacture of one form of channel plate according to one form of the method of the invention.
Figure 4:
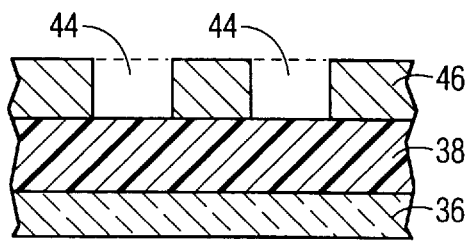
Figure 5:
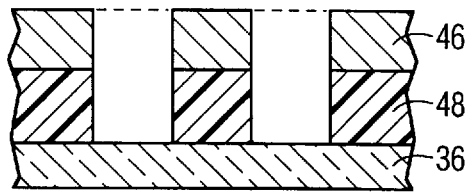
Figure 6:
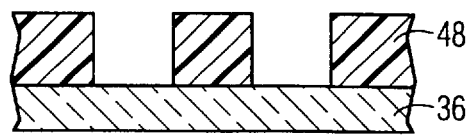

Other advantages of the invention are that only one lithographic step is needed, represented by the mask 42 in FIG. 3.

The invention is generally applicable to all kinds of electronic arrays of data elements involving addressing, especially to flat displays, and in particular to displays of the plasma-addressed type, especially PALC displays that typically have a small channel pitch for use in computer monitors, workstations or TV applications.

While polyimide materials are the preferred organic materials to make the flanking walls of the channels in the channel plate, the invention is not limited thereto. Other suitable organic materials can be substituted. For example, resists, which after exposure to sensitizing radiation can be developed in a wet or dry environment, can also be used.

Preferred examples for the FIG. 10 embodiment are flanking walls of a polyimide material having a width of about 20–50 μm, a height of about 50–160 μm, and a pitch of about 200–500 μm.

It will be appreciated that the drawing figures are not to scale and in particular the channel widths have been exaggerated to show the electrodes.

Still further, while the channels in the substrate are typically straight, the invention is not limited to such a configuration and other channel shapes, such as a meandering shape, are also possible within the scope of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A structure for an electronic array comprising elongated channels on a substantially transparent substrate and electrodes in each of the channels, channel-defining flanking walls of insulating material on the substrate with a thin-dielectric sheet-like member provided over the flanking walls, characterized in that:

a) the flanking walls of insulating material are constituted of organic material, b) each of the flanking walls is covered with a protective layer to prevent deterioration and c) the flanking walls are separated from each other only by the protective layers and the electrodes.

2. A structure as claimed in claim 1, wherein the flanking walls are of a polyimide material.

3. A plasma channel plate for use in a PALC display device comprising a substantially transparent substrate, elongated channels on the substrate formed by substantially opposed flanking walls characterized in that:

a) each of the flanking walls is of a polyamide material and, b) each of the flanking walls is covered with a protective layer to prevent deterioration.

4. A plasma channel plate as claimed in claim 3, further comprising on the protective layer on each of the flanking walls is provided facing electrodes.

5. A plasma channel plate as claimed in claim 3, wherein the walls have a width of about 20–50 μm, a height of about 50–160 μm, and a pitch of about 200–500 μm.

6. A plasma-addressed electronic array comprising a layer of electro-optical material between a first substrate comprising data electrodes and a channel plate as claimed in claim 3.

* * * * *